April 2, 1968 — J. H. BIRMAN — 3,375,702

LEAK DETECTION METHOD

Filed June 7, 1965 — 2 Sheets-Sheet 1

INVENTOR.
JOSEPH H. BIRMAN

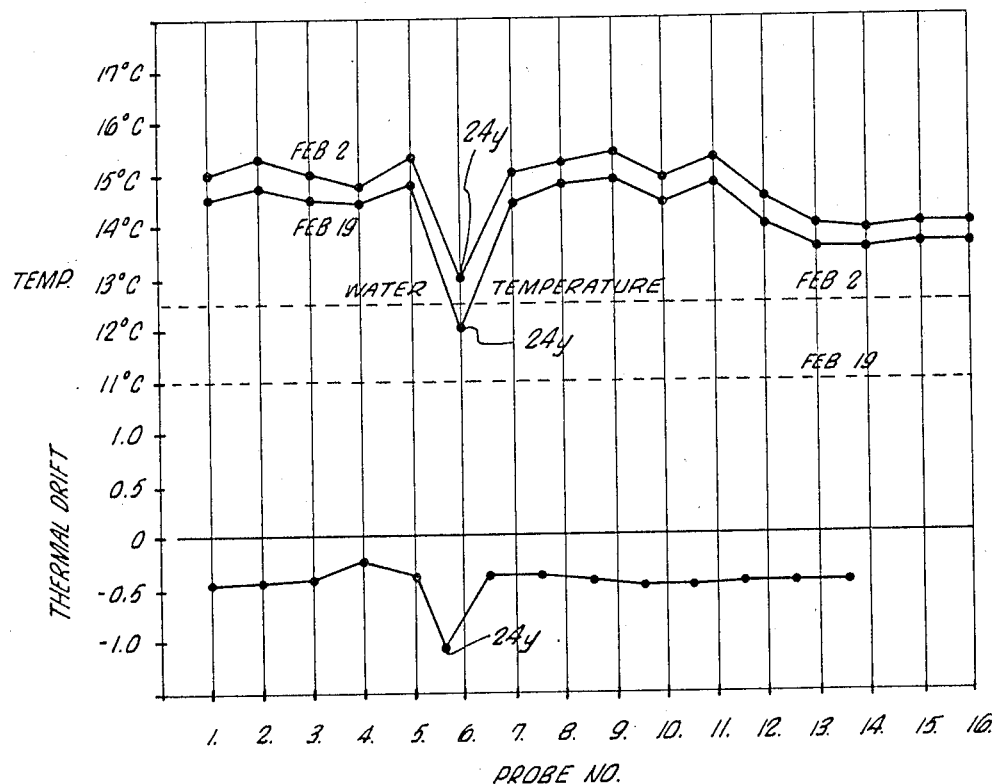
FIG_4_
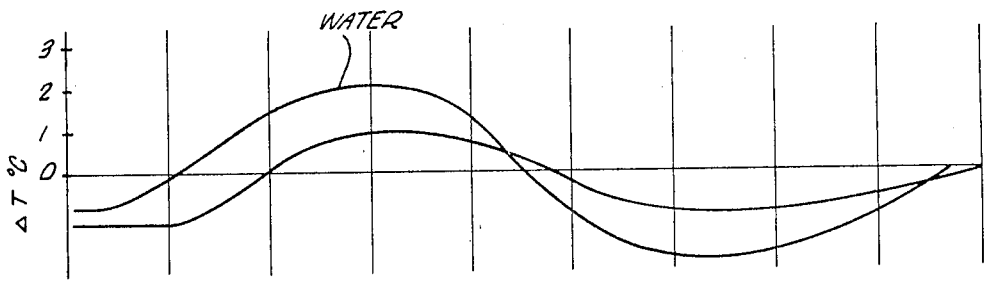
FIG_2_

3,375,702
LEAK DETECTION METHOD
Joseph H. Birman, La Crescenta, Calif., assignor to Geothermal Surveys, Inc., Los Angeles, Calif., a corporation of Nevada
Filed June 7, 1965, Ser. No. 461,924
7 Claims. (Cl. 73—40)

ABSTRACT OF THE DISCLOSURE

A geothermal method for detecting fluid leakage through an earthen or mineral dam or barrier by detection of anomalous thermal drift. One or more arrays of electrical temperature sensors are embedded in the dam to measure the thermal drift. The sensor output may alternatively be compared with ambient or fluid temperature.

---

This invention relates to a process and apparatus for detecting fluid leakage through barriers such as earth-fill dams, levees and dikes.

The problem to which the invention is directed is the detection of incipient leakage before it becomes so obvious as to be observable by eye or dangerous. It is common experience that initial and perhaps non-serious leakage through earth-fill structures, for example, follows a path through the barrier material generally downwardly into the underlying formation and thence downstream of the structure. Sometimes, a leakage of this type will gradually weaken the earthen barrier until, by the time fluid appears at the downstream face of the dam, there is danger of serious rupture or collapse. The recent failure of the Baldwin Hills Dam in Los Angles, Calif., just a matter of hours after leakage was first visually detected, was a tragic example of the speed with which final collapse can occur.

Another leakage pattern involves flow through the foundation from the reservoir outwardly and totally beneath the barrier. This type of leakage may slowly and invisibly undermine the earthen structure. Some earth-fill dams are provided with a clay core extending a number of feet into the foundation as a partial preventive against this type of undermining.

In my copending application Ser. No. 201,713, filed June 11, 1962, and entitled, "Geothermal Prospecting" (U.S. 3,217,550 issued Nov. 16, 1965), I have described a new process of geothermal surveying for the detection and mapping of subsurface thermal anomalies. The method described in this copending application comprises the steps of inserting a plurality of quite sensitive temperature probes at spaced points in the area to be surveyed and to generally uniform depths within a stratum sensitive to seasonal temperature variations. The temperatures of these probes are determined after probe equilibrium has been established, and the determination is made independently of this initial temperature measurement of the direction of temperature deviation of the subsurface anomaly under investigation from normal subsurface temperature. As explained in some detail in the copending application, this determination can be made in a number of ways and, quite typically, by obtaining a second set of temperature readings from the buried probes at a suitable time interval, which may be measured in hours, days or even weeks after the first set of readings. The existence of a subsurface anomaly such as flowing water, geothermal steam, a large protrusion of bedrock, or the like, will have a detectable and interpretable attenuating effect on the response of the probes in the area of such anomaly to the temperature drift of the formation as sensed by the several probes.

I have now found that certain of the basic principles upon which the described method of geothermal surveying is founded can be made use of in the thermal detection of leakage through or under fluid-storage barriers. This invention is concerned with storage barriers of mineral type, such as earthen and concrete structures, and the term "barrier" is used herein to include any such mineral structures. Some such barriers are composed of a mixture of clay and peaty materials and, although the latter are not mineral in nature, such a mixed composition structure is intended to be included in the generic term. I have found and demonstrated in the field that leakage of even minor magnitude produces within an earthen structure, whether it be dams, dikes or levees, a thermal anomaly or perturbation that can be sensed and identified provided that temperature sensing means of appropriate sensitivity are employed and information from these temperature sensing means is correlated with ambient conditions to which the earth barrier and the retained water body are exposed.

In practice, the method of this invention involves the process for detecting the leakage of fluid from a body of fluid retained at least in part by a barrier which comprises inserting a plurality of temperature sensitive probes in and at spaced intervals along the barrier and at approximately equal depths therein. The temperatures registered by these several probes are determined preferably to a degree of accuracy of $\pm.01°$ C. and only after the probe has reached equilibrium with the surrounding barrier material; that is, after the temperature effects of drilling and insertion have been dissipated. At this stage of the process, a significant deviation in the temperature of one or two probes with respect to the majority of probes will of course establish that some anomalous condition exists in the area of these deviated probes. However, the mere existence of a temperature deviation without more information cannot be taken as evidenciary of any particular cause since such deviation can be produced by local shading of the barrier, severe air currents in this particular area of the barrier, inhomogeneity in the composition of the barrier, or of primary importance to this discussion, the actual leakage of water through the barrier. In this respect, the problem to which the present invention is directed differs markedly from those encountered in the practice of the invention described in the above-referenced copending application in which such effects as shade, and the like, are insignificant. Accordingly, the method further requires that correlated information be secured and this may be done simply by determining a second set of temperatures in time-spaced relation to the first set and from the same probes or in some instances by a measurement of the fluid temperature behind the barrier, this latter means being less reliable than the former. A classic and most common example of this problem involves water storage within earthen barriers, such as dikes or earth-fill dams. The invention, for purposes of convenience, will be described in relation to its application in this situation.

In the development of a thermal approach to the problem of detecting incipient water leakage through earthen barriers, there must be taken into account the diurnal, semi-seasonal and seasonal variations to which both the earth barrier and the water are subject. Definite placement of the temperature sensors is a factor in the attenuation of each of these variables, and it is possible to locate the temperature probes beneath the influence of all but seasonally-induced variations in both the water body and the earth barrier if each is of sufficient depth. It is possible in extremely large dam structures, particularly if located in mild climates, that the probes might be placed sufficiently deep to avoid even the seasonal wave. In general, and assuming an appreciable thickness of the barrier, a ten-foot penetration of the earth will substantially obscure both diurnal and semi-seasonal variations. Under varying climate and dam composition conditions, the depth at which only seasonal variations will be sensed varies. Diurnal variations are those occurring as a consequence of the changes in atmospheric temperature within a twenty-four hour period. Seasonal variations are those occurring throughout a complete yearly cycle, and characteristically seasonal variation shows one maximum and one minimum during the year. Semi-seasonal variations are temporary perturbations superimposed on the seasonal curve by brief hot or cold spells.

In a situation where deep water is involved, leakage may of course occur at shallow level where both diurnal and semi-seasonal variations are encountered, at a deep level where only seasonal variations are apparent, or at an intermediate level where only diurnal variations are completely obscured. In this type of case, i.e. in deep water dams, the temperature probes are preferably set in the barrier at a level insulated from all but seasonal variations. With this placement, modulation of the normal seasonal cycle responsive to seasonal, semi-seasonal or diurnal perturbations of the water temperature are each easily detected. This is not to say that shallower probes, i.e. established in the earth barrier at a depth which may be subject to semi-seasonal or even diurnal temperature variation, cannot sense deep leaks by continuous attention to water and barrier temperatures but the effects of semi-seasonal and diurnal variations within the barrier render shallower probes less sensitive to deep leaks of relatively small extent.

On the other hand, for the rapid detection of relatively shallower leaks whether from the upper portions of a deeper water body or from a generally shallow water body, the probes may be desirably, although not necessarily, placed in the diurnal zone of the earth barrier. Since the diurnal variation of shallow water is of greater amplitude than that which occurs in an adjacent earth barrier, shallow probes will be quickly responsive to any leakage of shallow water through the barrier.

It should be noted that the process here described, although relying on many of the fundamentals to which my aforementioned copending application relates, differs both in the nature of the problem to be solved and its resolution. In the situation described in the aforementioned application, one is surveying and mapping subsurface conditions of generally permanent character or at least a character which changes only over the course of years, decades, or centuries. For example, the flow path of subsurface water in a desert basin is not likely to change significantly, and accordingly the process for mapping such subsurface flow is a more or less one-time operation. Also, localized factors, such as shade, breeze, exposure to sun, and the like, have little or no influence on geothermal mapping but are of pronounced effect in the thermal analysis of a dam structure. On the other hand, the problem to which this invention is directed is not only the detection of an existing condition, namely leakage through an earth barrier, but also monitoring such barriers for the detection of leaks that may develop. It is not ordinarily sufficient to survey a dam which is found to be impervious at a given time and may at any time in the future develop leakage, which is a forerunner of serious trouble.

The invention will be more clearly understood by reference to the accompanying drawings, in which:

FIG. 2 is a diagram of temperature conditions that may be encountered in such a reservoir;

FIG. 4 is an artificial but, nonetheless, typical plot of temperatures recorded in the probe pattern shown in FIG. 3 to illustrate information that may be derived therefrom in accordance with the invention.

Figure 1:
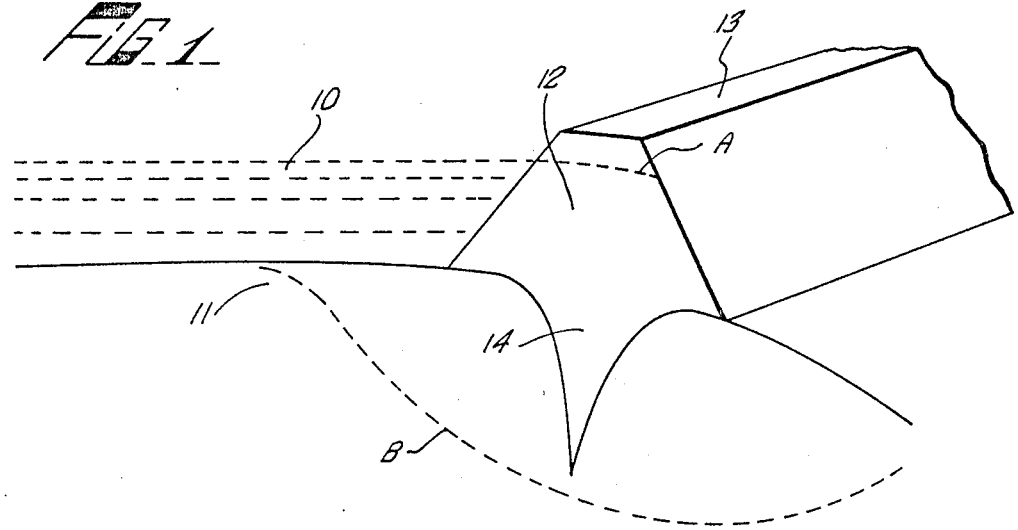
FIG. 1 is a cut-away perspective view of an earth barrier water reservoir.

In FIG. 1 there is shown in perspective section a water body 10 supported or bottomed on a foundation 11 and retained by an earth-fill dam or dike 12. Normally, an earth-fill dam of this type and of any size is formed by a homogeneous mixture of fill, which may include a wide variety of earth and coarser materials, and is in section in the shape of a truncated triangle having a flat upper surface 13 on which a road or at least a walkway is usually formed.

The depth of the water body 10, in any system such as this, is an important consideration in determining the hydrostatic head at the face of the dam and on the foundation. If the water body is of an appreciable depth, it is the frequent practice to build the dam with a clay keel or core 14.

Leakage through or around a dam 12 as shown in FIG. 1 may fill anywhere below an upper limit represented by the dotted line A and a flow path beneath the core 14 such as at dotted line B. Even leakage through the core 14 can, and in fact does, occur on occasion. If a core is employed, the purpose of so doing is to prevent, or at least inhibit, leakage through the foundation, and it can be therefore assumed that the more likely leakage in such a situation is through the earth barrier itself. However, a deep leak as represented by the dotted line B cannot be ruled out.

FIG. 2 shows the typical low frequency temperature cycle to which the innermost portions of the water body 10 and the earth barrier 12 are subject. This example relates to a relatively shallow water body which characteristically follows the seasonal cycle more closely and thus with greater amplitude than the barrier. With very large or deep reservoirs, this relationship may be reversed. The two curves shown in FIG. 2 represent a temperature cycle of one year with a peak-to-peak maximum amplitude of approximately 6° C. Because of the higher heat conductivity of water, which, as noted, is assumed to be relatively shallow, the peak-to-peak amplitude of the water cycle is higher than that of the dam cycle, as illustrated. It is recognized that this is an idealized curve, and can only be an approximation for the type of system shown in FIG. 1, but is, at the same time, quite typical. Ordinarily, the temperature variations in the water over the yearly cycle will, as noted, exceed the variations in the barrier as sensed by the probes at ten-foot depths, and the cross-over of the two curves will generally be in late spring and late fall. At the surface of the water body and at marginal areas of the dam, there will be superimposed on this annual cycle semi-seasonal variations due to temporary hot or cold spells and, depending on the depth of sensing in both cases, diurnal variations responsive to temperature changes between day and night. The invention is primarily based on the difference in the response of the mineralized structure of the dam and the water to any or all of these temperature variations. If these responses were identical it would be impossible by the means described herein to sense any flow of water through the dam structure.

Figure 3:
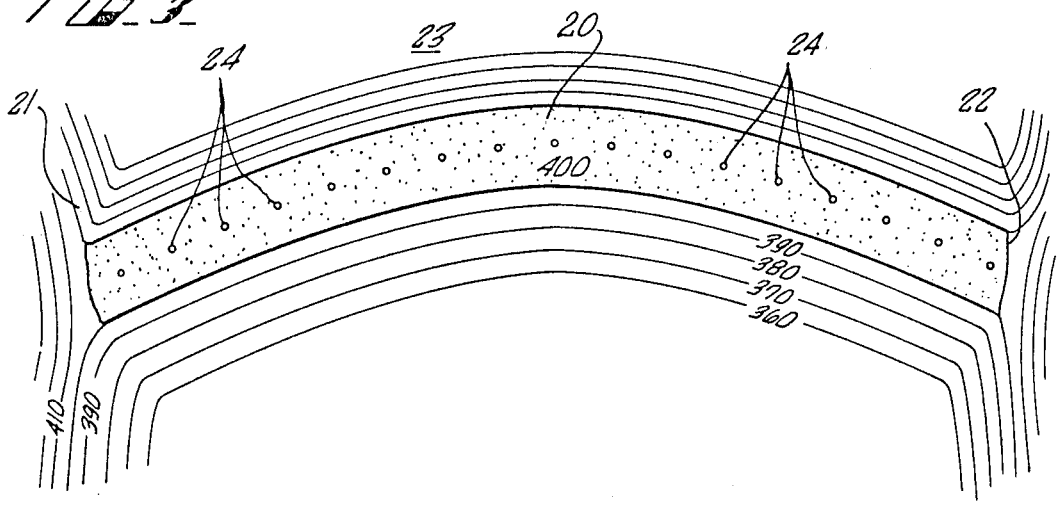
FIG. 3 is a topographic plan view of a typical earth-fill dam structure showing one possible arrangement of temperature sensing probes in accordance with the invention.

FIG. 3 is a theoretical topographical plan view of an arcuate earth-fill dam 20 extending between abutting hills 21, 22 and retaining a body of water 23. As illustrated, the dam 20 follows a theoretical topo-line of 400 feet.

In accordance with the practice of the invention, a plurality of temperature sensing probes 24 are inserted in the dam at spaced intervals and at generally uniform depth. In some applications it may be desirable to insert a portion of the probes at one uniform depth and another portion of the probes at a different uniform depth. This, for example, may take the form of alternate probes at two depth levels; one possibly in an area sensitive to diurnal temperature variation and the other in the region sensitive only to seasonal temperature variations. In the presently described example, and for purposes of discussing FIG. 4, it will be assumed that all of the probes 24 are at a uniform depth below the zone sensitive to diurnal temperature variations and within the zone sensitive to seasonal temperature variations.

The temperature sensors preferred for the practice of the invention are thermistors housed in a small diameter metal-tipped probe. Thermistors have the property of undergoing a resistance change as a function of temperature. This change can be easily sensed to a high degree of accuracy with a conventional electrical bridge circuit. Reference throughout this specification and claims to a "temperature indication" or "temperature measurement" at the probes is intended to include the detection of the temperature responsive resistance measurement at a probe of this type regardless of whether the detected resistance value is actually converted to a corresponding temperature reading. In other words, in using the information developed from the probes in the manner hereinafter described, there is no practical difference between the use of resistance figures, which are known to be temperature-responsive, and the temperature to which such resistance figures may be converted. Two or more sensors of this type may be located at different points along the length of a probe, so that two or more sets of data may be obtained from a like number of sets of sensors. Preferably, for the practice of the invention, the temperature sensors should be accurately sensitive and calibrated to a sensitivity of about ±.01° C. Less sensitive sensors are usable, but a significant time delay is introduced in such event because only relatively larger temperature changes have significance.

FIG. 4 comprises two graphs, one showing the temperatures of the several probes 24 of FIG. 3 on two separate dates, and the other constituting a plot of the thermal drift exhibited by the probes in this period. In order to establish a frame of reference with respect to normal seasonal activity, it is assumed for purposes of this discussion that one series of temperatures is taken at the probes 24 on February 2, and a second series of temperatures is taken at the same probes on February 19. The two curves in the upper portion of FIG. 4 are thus identified, and also in the figure the temperature of the water body 23 is shown on February 2 and again on February 19.

It is observed by comparing the February 2 and February 19 temperature curves that the latter is consistently below the former, regardless of the other peregrinations of the curves, this being due to the fact that the earth barrier is still in the portion of the seasonal cycle, which I refer to as the "winter decline." Referring back to FIG. 2, this conforms with the negative slope portion of the illustrated seasonal curves.

Throughout the extent of the temperature curves in FIG. 4 there are minor variations from probe-to-probe, as might be expected due to inhomogeneity of the barrier material, but in all cases these minor variations are substantially equally reflected in the two curves. The right-hand extremity of the two curves shows a considerably lower temperature for both curves, which is the type of result that is expected if this portion of the earth barrier is shaded throughout a portion of the day by an adjacent hill. One major discontinuity of both curves is illustrated at the probe Y, and it is also observed that the temperature difference at the probe Y between February 2 and February 19 is considerably greater than the temperature difference between the other probes in the same interval of time. Simultaneously, it is noted that the water temperature has dropped considerably between these same two dates. This differentiating feature of the behavior of probe Y is clearly illustrated in the plot of thermal drift in the lower portion of FIG. 4. This shows that the normal drift over the two-week interval is in the neighborhood of .25° C. to .5° C., whereas the drift at probe Y is in the neighborhood of 1° C.; in both cases negative because the survey is made in the period of winter decline.

From this simplified albeit realistic temperature profiling of the dam shown in FIG. 3, it can be predicted with great reliability that there is a water leakage through the dam in the vicinity of probe Y. When this fact is established, it is further possible within the purview of the invention to survey the area of surrounding point Y with a greater concentration of probes and at varying depths so as to more closely pinpoint the region, the depth, and the extent of the leak, initially detected by the broad survey as indicated.

For achieving a reliable survey of an earth barrier, as shown for example in FIG. 3, the several probes 24 may be set, for example, at approximately 40-foot linear intervals. Probe spacing will determine the sensitivity and response time of the system to a leakage condition. Closer spacing than 40 feet will obviously give more detailed results and perhaps will detect a water leak over a shorter period of observation than will the 40-foot spacing. Conversely, a larger spacing interval will be operative with a correspondingly greater response time to a leak midpoint between the probes. In some applications, as for example salt basin settling ponds where concentrated salt water leakage through the bordering dikes is of economic concern but not of major socialogical concern, wider probe spacings are frequently acceptable. It may be acceptable under certain conditions to set temperature probes at 100 or even 200 feet intervals in such dikes and rely on a longer period of observation of these widely spaced probes to detect anomalous drift characteristics indicative of a leakage problem.

As previously noted in the example illustrated in FIG. 4, it is convenient to sample the temperatures at the several probes at time intervals such that the average temperature change of the several probes is at least about 0.25° C. This has proven to be a sufficiently gross temperature drift to readily permit detection of an anomalous drift in one or more of the group of probes involved. The period of time in which the probes will experience a temperature drift of this magnitude will vary depending upon the nature of the barrier in which they are disposed, the depth of insertion in the barrier, climatic conditions in the region involved, etc. In the specific example given, the time interval of two weeks results in a temperature drift of the majority of the probes in the region of from about 0.25° C. to about .5° C. If these probes had been located at a shallower depth, a shorter interval of time would normally have resulted in the same degree of temperature drift, and if at a greater depth, a longer interval of time normally would be required.

It should be re-emphasized that the method of the invention can be predicated not only on perturbations of the normal seasonal temperature cycle, as illustrated and described with relation to FIGS. 3 and 4, but can also be made to depend on semi-seasonal or even diurnal ambient variations.

For example, the probes 24 in the barrier 20 of FIG. 3, particularly if this is a relatively small dam or dike, may be set in the barrier at a relatively shallow depth and adjacent the water interface. The variations in temperature in these probes will be considerably greater than that detected by probes sensitive only to seasonal variations, and there will be a wider divergence of temperature from probe-to-probe brought about by such factors as shade, wind, and other effects to which the deeper probes are not so sensitive. However, I have found that there is a wide variation in the response of a barrier and the adjacent water to transitory ambient temperature variations such as those encountered between daylight and night hours, and if a temperature pattern is obtained from the probes in the barrier responsive to these diurnal temperature variations, a modulating effect of the differing response of the water barrier in areas where leakage does in fact occur will be detectable in the same fashion as that illustrated with respect to the more muted response of FIGS. 3 and 4.

The invention has thus far been described with relation to the detection of leakage of fluid through a barrier, such as an earthen barrier, at a given point in time. However, one of the most important aspects of the invention is the facility with which a dam, for example, can be continuously monitored with respect to its permeability to water. By this means, relatively minor leakage can be sensed and indicated well in advance of any visual mode of determination, and corrective measures may be instituted before a dangerous and more obvious condition exists.

For purposes of continuous or semi-continuous monitoring, the several temperature sensitive probes are allowed to remain in the dam structure and may be read daily, weekly or at any desired frequency, and may thus be intermittently correlated with each other to detect any contra seasonal or contra diurnal drift of one or more probes. In long-range monitoring applications, it is also advantageous to take representative water temperatures along with the probe temperatures from which also any anomalous change in temperature of one or more probes in the direction of the deviation of water temperature from average probe temperature will be significant and immediately detected.

An even more sophisticated system involves connecting the plurality of temperature sensors to a recorder or even a computer. In the first instance, a continuous profile of dam temperature is recorded for periodic visual interpretation in the manner herein described. If a computer is used it need only be provided with such information as ambient temperature and water temperature together with a continuous input of probe temperatures. With this information a properly constructed computer of very simple design is able to sense and communicate the fact that one or more probes have commenced an anomalous temperature excursion. If such a temperature excursion of one probe is not explained by the concurrent ambient and water temperature variations, there is a clear indication of water leakage at that probe.

Figure 5:
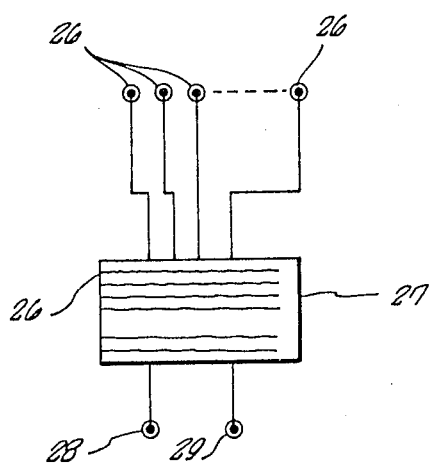
FIG. 5 is a schematic illustration of a continuous monitoring system in accordance with the invention.

FIG. 5 is a schematic circuit diagram of a continuous monitoring system. The figure shows a plurality of probes 26 connected in parallel to a recorder 27. The probes 26 may all be disposed in a dam structure, as for example as illustrated in FIG. 3. The recorder may also be connected to a temperature sensor 28 for registering ambient temperature, and a temperature sensor 29 for registering water temperature. The temperatures indicated by the probes 26, 28 and 29 are continuously recorded on the recorder 27 and, as noted above, incipient leakage may be detected by periodic visual observation of the recorded curves. Within the same schematic circuit diagram, the recorder 27 may be, for example, a recording computer including conventional means for periodically scanning the several probes either through an actual scan of the probe output or a visual scan of the recorded curves. It is a simple matter for such a computer to sense an unusual deviation in the plots for the several probles 26 and, in any prearranged manner, signal such occurrence.

I claim:

1. A process for detecting the leakage of a fluid from a body of fluid retained at least in part by a mineral barrier which comprises the steps of
   (a) setting a plurality of temperature sensitive probes at known depths in and at spaced intervals along the barrier,
   (b) determining a first temperature registered at each of the several probes, and
   (c) determining a second temperature registered at each of the several probes at a later time whereby the deviation of any probe from the temperature drift pattern established by the other probes contra to or in excess of variations induced by ambient conditions to which the barrier is exposed indicates the modulation of the temperature drift of said probe by the passage of fluid through the barrier in the vicinity thereof.

2. A process for monitoring a mineral barrier for leakage therethrough of fluid retained by the barrier which comprises steps of
   (a) setting a plurality of temperature sensitive probes at known depths in and at spaced intervals along the barrier, and
   (b) periodically determining the temperatures registered at the several probes whereby deviation of any probe from the temperature drift pattern established by the other probes contra to or in excess of variations induced by ambient conditions to which the barrier is exposed indicates the modulation of the temperature of such probe by the passage of fluid through the barrier in the vicinity thereof.

3. A process for continuously monitoring a mineral barrier for leakage therethrough of fluid retained by the barrier which comprises the steps of
   (a) setting a plurality of temperature sensitive probes at known depths in and at spaced intervals along the barrier, and
   (b) continuously determining the temperatures registered at the several probes whereby deviation of any probe from the temperature drift pattern established by the other probes contra to or in excess of variations induced by ambient conditions to which the barrier is exposed indicates the modulation of the temperature of such probe by the passage of fluid through the barrier in the vicinity thereof.

4. A process for detecting the leakage of a fluid from a body of fluid retained at least in part by a mineral barrier which comprises the steps of
   (a) setting a plurality of temperature sensitive probes at known depths in and at spaced intervals along the barrier,
   (b) determining the temperature of the fluid in the region of the barrier, and
   (c) determining the temperatures registered at the several probes whereby the variation of temperature at any probe from the temperature pattern established by the other probes and in the direction of the fluid temperature to indicate the modulation of the temperature of said probe by the passage of fluid through the barrier in the vicinity thereof.

5. A process for detecting the leakage of a fluid from a body of fluid retained at least in part by a mineral barrier which comprises the steps of
   (a) setting a plurality of temperature sensitive probes at known depths in and at spaced intervals along the barrier,
   (b) determining a first temperature registered at each of the several probes,
   (c) determining a second temperature registered at each of the several probes at a later time, and
   (d) determining the temperature of the fluid body adjacent the barrier whereby the deviation of any probe from the temperature drift pattern established by the other probes where such deviation is in the direction of the fluid temperature to indicate the modulation of the temperature of said probe by the passage of fluid through the barrier in the vicinity thereof.

6. A process for detecting the leakage of a fluid from a body of fluid retained at least in part by a mineral barrier which comprises the steps of
   (a) setting a first plurality of temperature sensitive probes at a given depth in and at spaced intervals along the barrier,
   (b) setting a second plurality of temperature sensitive probes at a different given depth in and at spaced intervals along the barrier, and (c) determining the temperatures registered at the several probes whereby the variation of temperature at any probe from the temperature pattern established by the other probes contra to or in excess of variations induced by ambient conditions to which the barrier is exposed indicates the modulation of the temperature of said probe by the passage of fluid through the barrier in the vicinity thereof.

7. A process for detecting the leakage of a fluid from a body of fluid retained at least in part by a mineral barrier which comprises the steps of (a) setting a first plurality of temperature sensitive probes at a given depth in and at spaced intervals along the barrier, (b) setting a second plurality of temperature sensitive probes at a different given depth in and at spaced intervals along the barrier, (c) determining a first temperature registered at each of the several probes, (d) determining a second temperature registered at a later time at each of the several probes, and (e) determining the temperature of the fluid body adjacent the barrier whereby the variation of temperature drift at any probe from the temperature drift pattern established by the other probes contra to or in excess of variations induced by ambient conditions to which the barrier is exposed indicates the modulation of the temperature of said probe by the passage of fluid through the barrier in the vicinity thereof.

References Cited

UNITED STATES PATENTS 2,403,704   7/1946   Blau ---------------- 73—432

LOUIS R. PRINCE, *Primary Examiner.*

FREDERICK SHOON, *Assistant Examiner.*